United States Patent
Chen et al.

(10) Patent No.: US 12,190,633 B2
(45) Date of Patent: Jan. 7, 2025

(54) METHOD FOR DETERMINING VALIDITY OF FACIAL FEATURE, AND ELECTRONIC DEVICE

(71) Applicant: HONOR DEVICE CO., LTD., Guangdong (CN)

(72) Inventors: Tianluo Chen, Shenzhen (CN); Lei Qin, Shenzhen (CN); Heng Zhou, Shenzhen (CN); Xin Ding, Shenzhen (CN); Yongtao Jiang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 431 days.

(21) Appl. No.: 17/617,893

(22) PCT Filed: Jun. 9, 2020

(86) PCT No.: PCT/CN2020/095012
§ 371 (c)(1),
(2) Date: Dec. 9, 2021

(87) PCT Pub. No.: WO2020/248950
PCT Pub. Date: Dec. 17, 2020

(65) Prior Publication Data
US 2022/0309780 A1    Sep. 29, 2022

(30) Foreign Application Priority Data

Jun. 11, 2019    (CN) .......................... 201910502644.3

(51) Int. Cl.
*G06V 40/16*    (2022.01)
*G06T 7/73*    (2017.01)
*G06V 10/74*    (2022.01)

(52) U.S. Cl.
CPC .............. *G06V 40/168* (2022.01); *G06T 7/73* (2017.01); *G06V 10/761* (2022.01);
(Continued)

(58) Field of Classification Search
CPC .. G06V 40/168; G06V 40/172; G06V 40/171; G06V 10/761; G06T 2207/10016; G06T 2207/30201; G06T 7/73
See application file for complete search history.

(56) References Cited

U.S. PATENT DOCUMENTS 7,623,687 B2    11/2009    Bronstein et al.
8,457,367 B1    6/2013    Sipe et al.
(Continued)

FOREIGN PATENT DOCUMENTS

CN    101763636 A    6/2010
CN    103426024 A    12/2013
(Continued)

*Primary Examiner* — Shefali D Goradia
(74) *Attorney, Agent, or Firm* — Fish & Richardson P.C.

(57) ABSTRACT

A method for determining validity of a facial feature, and an electronic device are provided. The method includes: determining posture information and/or facial change information based on a facial feature of a first video image, where the posture information is used to represent deflection of a character's head indicated by the facial feature in the first video image, the facial change information is used to represent a position change status of the character's head in the first video image and a second video image, and the second video image is a frame of image preceding the first video image in a video stream to which the first video image belongs; and determining whether the facial feature is an invalid feature based on the posture information and/or the facial change information, and further determining whether to perform three-dimensional reconstruction processing on the character's face in the first video image.

16 Claims, 8 Drawing Sheets

(52) U.S. Cl.
CPC .......... *G06V 40/171* (2022.01); *G06V 40/172* (2022.01); *G06T 2207/10016* (2013.01); *G06T 2207/30201* (2013.01)

(56) References Cited

U.S. PATENT DOCUMENTS

| | | |
|---|---|---|
| 8,599,238 B2 | 12/2013 | Wu et al. |
| 9,446,510 B2 * | 9/2016 | Vu ........................ G05D 1/0272 |
| 9,530,045 B2 | 12/2016 | Wang et al. |
| 9,916,494 B2 | 3/2018 | Zou et al. |
| 9,994,229 B2 * | 6/2018 | Ricci ........................ A61B 7/04 |
| 10,268,888 B2 * | 4/2019 | Osterhout ............. H04N 23/661 |
| 10,545,497 B1 * | 1/2020 | Cui ........................ G05D 1/0016 |
| 11,100,360 B2 | 8/2021 | Van et al. |
| 2006/0148323 A1 | 7/2006 | Canzler et al. |
| 2018/0218515 A1 | 8/2018 | Terekhov et al. |
| 2019/0370578 A1 * | 12/2019 | Meng ................... B60W 50/14 |

FOREIGN PATENT DOCUMENTS

| | | | | |
|---|---|---|---|---|
| CN | 106650688 A | 5/2017 | | |
| CN | 107784263 A | 3/2018 | | |
| CN | 107909061 A | 4/2018 | | |
| CN | 107944424 A | 4/2018 | | |
| CN | 108197534 A | 6/2018 | | |
| CN | 109117765 A | 1/2019 | | |
| CN | 109151540 A | 1/2019 | | |
| CN | 109598196 A | 4/2019 | | |
| EP | 3617935 A1 * | 3/2020 | ............ | B60K 28/06 |
| RU | 2601185 C2 | 10/2016 | | |
| WO | 2011046710 A1 | 4/2011 | | |
| WO | 2018108926 A1 | 6/2018 | | |

* cited by examiner (a) (b) (c)

METHOD FOR DETERMINING VALIDITY OF FACIAL FEATURE, AND ELECTRONIC DEVICE

CROSS-REFERENCE TO RELATED APPLICATIONS

This application is a national stage of International Application No. PCT/CN2020/095012, filed on Jun. 9, 2020, which claims priority of Chinese Patent Application No. 201910502644.3, filed with the China National Intellectual Property Administration on Jun. 11, 2019. Both of them are hereby incorporated by reference in its entirety This application claims priority to Chinese Patent Application No. 201910502644.3, filed with the China National Intellectual Property Administration on Jun. 11, 2019 and entitled "METHOD FOR DETERMINING VALIDITY OF FACIAL FEATURE, AND ELECTRONIC DEVICE", which is incorporated herein by reference in its entirety.

TECHNICAL FIELD

Embodiments of this application relate to the field of image processing technologies, and in particular, to a method for determining validity of a facial feature, and an electronic device.

BACKGROUND

At present, cameras on some notebook computers are designed to be hidden, and are located below the screens. When users collect images through the cameras on the notebook computers, a face in an image has an upward elevation angle, and user experience is poor. Therefore, the angle of the face needs to be corrected. Nowadays, a general three-dimensional reconstruction technology performs three-dimensional reconstruction on a single frame of facial image, for example, using a three-dimensional morphable model (3d morphable model, 3DMM) technology to correct a face in a camera image to enhance user experience. The three-dimensional reconstruction technology generally reconstructs and adjusts the face based on the recognized facial features. Therefore, a facial effect of the three-dimensional reconstruction technology depends on accuracy of recognizing a feature point in the facial feature.

Currently, machine learning methods are generally used to determine the validity of the facial feature, but machine learning is based on a pre-trained model, and credibility of the model depends on training samples. Therefore, credibility of the determining cannot be determined, and the machine learning-based determining method is highly complex.

SUMMARY

Embodiments of this application provide a method for determining validity of a facial feature, and an electronic device, so as to resolve a problem of high determining complexity of a machine learning-based method.

According to a first aspect, an embodiment of this application provides a method for determining validity of a facial feature. The method can be performed by any electronic device, or can be performed by a chip or a processor in the electronic device. The method includes: obtaining a facial feature of a first video image; determining posture information and/or facial change information based on the facial feature of the first video image, where the posture information is used to represent deflection of a character's head indicated by the facial feature in the first video image, the facial change information is used to represent a position change status of the character's head in the first video image and a second video image, the second video image is a frame of image preceding the first video image in a video stream to which the first video image belongs, and a quantity of video images between the second video image and the first video image is within a preset quantity range; and determining whether the facial feature is an invalid feature based on the posture information and/or the facial change information.

According to the foregoing solution, the posture information and/or the facial change information are/is determined based on the facial feature, so as to determine whether the facial feature is an invalid feature. No training model is required and complexity is low.

In a possible design, the determining posture information and/or facial change information based on the facial feature of the first video image includes: further determining the posture information and/or the facial change information based on the facial feature of the first video image when the facial feature does not include a feature point located in an edge area of the first video image.

When the facial feature includes a feature point located in the edge area, there may be a blank left on an edge of an image after three-dimensional reconstruction, and an effect is poor. For example, when a feature point is too close to the edge of the image, it may be determined that the facial feature is an invalid feature. In this case, there is no need to perform the operation of determining posture information and/or facial change information based on the facial feature of the first video image, and subsequent operations. This improves accuracy of three-dimensional reconstruction, and can shorten determining time.

In a possible design, the posture information may include at least one of horizontal deflection used to represent left or right turning of the character's head, vertical deflection used to represent raising or lowering of the character's head, and inclination used to represent a skew degree of the character's head. The facial change information may include at least one of displacement of a position of the character's head in the first video image relative to a position of the character's head in the second video image, and an image similarity between a facial image of the first video image and a facial image of the second video image.

In a possible design, the determining whether the facial feature is an invalid feature based on the posture information and/or the facial change information may include: determining that the facial feature in the first video image is an invalid feature when it is determined that at least one of the following conditions is met:
  the foregoing displacement is greater than a first threshold;
  the foregoing image similarity is greater than a second threshold;
  the foregoing horizontal deflection is greater than a third threshold;
  the foregoing vertical deflection is greater than a fourth threshold; or
  the foregoing inclination is greater than a fifth threshold.

In the foregoing design, it is determined whether the facial feature is an invalid feature based on a result of comparing the posture information and/or the facial change information with the threshold. Complexity is low and processing time is short.

In a possible design, the facial feature may include N groups of feature points, where N is a positive integer greater than or equal to 1, and different groups of feature points belong to different facial organs; determining the displacement in the facial change information based on the facial feature of the first video image includes: determining a distance between a reference point of an i-th group of feature points in the first video image and a reference point of an i-th group of feature points in the second video image to obtain N groups of distances, where i represents a positive integer less than or equal to N; and determining an average value of the N groups of distances as the displacement, or determining an average value of the normalized N groups of distances as the displacement.

The foregoing design provides a simple and effective method for determining the displacement. The displacement is used to determine whether feature point tracking is accurate, and complexity is low.

In a possible design, the facial feature may include M groups of feature points, where M is a positive integer greater than or equal to 1, and different groups of feature points belong to different facial organs; determining the image similarity in the facial change information based on the facial feature of the first video image includes: determining a similarity between a j-th local feature image in the first video image and a j-th local feature image in the second video image to obtain M similarities, where j represents a positive integer less than or equal to M; the j-th local feature image in the first video image is determined based on a range enclosed by the j-th group of feature points of the first video image; the j-th local feature image in the second video image is determined based on a range enclosed by the j-th group of feature points of the second video image; and determining an average value of the M similarities as the image similarity.

The foregoing design provides a simple and effective method for determining the image similarity. A texture change status of two adjacent frames of images is determined by using the image similarity, and the texture change status is used to determine whether the feature point tracking is accurate, and further determine whether the facial feature is valid. Complexity is low.

In a possible design, the facial feature may include a left cheek feature, a right cheek feature, and a nose feature; determining the horizontal deflection based on the facial feature of the first video image includes: determining a first distance between a reference point of the left cheek feature and a reference point of the nose feature, and a second distance between a reference point of the right cheek feature and a reference point of the nose feature; and determining a ratio of the first distance to the second distance as the horizontal deflection, or determining a ratio of the second distance to the first distance as the horizontal deflection, where the reference point of the left cheek feature is a preset feature point in the left cheek feature, the reference point of the nose feature is a preset feature point in the nose feature, and the reference point of the right cheek feature is a preset feature point in the right cheek feature; or the reference point of the left cheek feature is a pixel corresponding to an average value of feature point coordinates included in the left cheek feature, the reference point of the nose feature is a pixel corresponding to an average value of feature point coordinates included in the nose feature, and the reference point of the right cheek feature is a pixel corresponding to an average value of feature point coordinates included in the right cheek feature.

The foregoing design provides a simple and effective method for determining the horizontal deflection. The horizontal deflection is used to determine whether the character's head has an excessive left or right turning posture, and further determine whether the facial feature is valid. Complexity is low.

In a possible design, the facial feature may include an eye feature, a chin feature, and a nose feature; determining the vertical deflection based on the facial feature of the first video image includes: determining a third distance between a reference point of the eye feature and a reference point of the nose feature, and a fourth distance between a reference point of the chin feature and a reference point of the nose feature; and determining a ratio of the third distance to the fourth distance as the horizontal deflection, or determining a ratio of the fourth distance to the third distance as the vertical deflection, where the reference point of the eye feature is a preset feature point in the eye feature, the reference point of the nose feature is a preset feature point in the nose feature, and the reference point of the chin feature is a preset feature point in the chin feature; or the reference point of the eye feature is a pixel corresponding to an average value of feature point coordinates included in the eye feature, the reference point of the nose feature is a pixel corresponding to an average value of feature point coordinates included in the nose feature, and the reference point of the chin feature is a pixel corresponding to an average value of feature point coordinates included in the chin feature.

The foregoing design provides a simple and effective method for determining the vertical deflection. The vertical deflection is used to determine whether the character's head has an excessive raising or lowering posture, and further determine whether the facial feature is valid. Complexity is low.

In a possible design, the facial feature may include a left eye feature and a right eye feature; determining the inclination based on the facial feature of the first video image includes: determining an angle in the horizontal direction of an offset of a connection line between a reference point of the left eye feature and a reference point of the right eye feature as the inclination, where the reference point of the left eye feature is a pixel corresponding to an average value of feature point coordinates included in the left eye feature, and the reference point of the right eye feature is a pixel corresponding to an average value of feature point coordinates included in the right eye feature; or the reference point of the left eye feature is a left eye pupil feature point in the left eye feature, and the reference point of the right eye feature is a right eye pupil feature point in the right eye feature.

The foregoing design provides a simple and effective method for determining the inclination. The inclination is used to determine whether the character's head has an excessive skew posture, and further determine whether the facial feature is valid. Complexity is low.

According to a second aspect, an embodiment of this application further provides an apparatus for determining validity of a facial feature, including units separately configured to perform the method according to the first aspect or according to any design of the first aspect.

According to a third aspect, an embodiment of this application further provides an electronic device, including a processor and a memory, where the processor is coupled to the memory; the memory is configured to store a program instruction; the processor is configured to read the program instruction stored in the memory, so as to implement the method according to the first aspect and any possible design of the first aspect.

According to a fourth aspect, an embodiment of this application further provides a computer storage medium, where the computer storage medium stores a program instruction, and when the program instruction runs on an electronic device, the electronic device is enabled to perform the method according to the first aspect and any possible design of the first aspect.

According to a fifth aspect, an embodiment of this application further provides a computer program product, where when the computer program product runs on an electronic device, the electronic device is enabled to perform the method according to the first aspect and any possible design of the first aspect.

According to a sixth aspect, an embodiment of this application further provides a chip, where the chip is coupled to a memory in an electronic device, and performs the method according to the first aspect and any possible design of the first aspect.

In addition, for technical effects brought by the second aspect to the sixth aspect, refer to the description of the first aspect. Details are not described herein again.

It should be noted that "couple" in this embodiment of this application means that two components are directly or indirectly combined with each other.

DESCRIPTION OF EMBODIMENTS

Embodiments of this application may be applied to an electronic device shooting scene, or an electronic device monitoring scene, or a video call or video conference scene between electronic devices, and certainly may alternatively be applied to a scene in which an electronic device performs three-dimensional reconstruction on a character's head in a captured image. For example, when a video call is made between electronic devices, a local electronic device transmits a facial image of a local user to a peer electronic device for display, so as to achieve the purpose of video communication.

Figure 1:
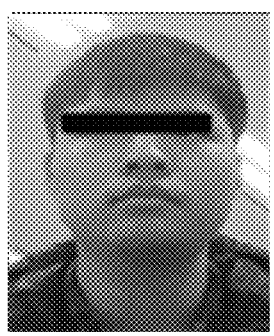
FIG. 1 is a schematic diagram of a three-dimensional reconstruction result according to an embodiment of this application.
Figure 1:
Figure 1:
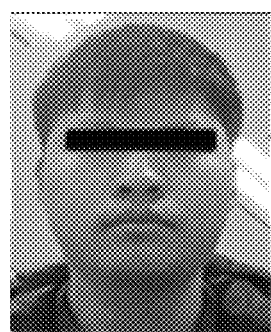

Any one of the foregoing scenes includes a process of collecting and processing a facial image by the electronic device. For example, as shown in FIG. 1, when a camera on the electronic device is arranged below or above a screen, and when the user collects an image by using the camera on the electronic device, a face in the picture may have an upward elevation angle or a depression angle, as shown in FIG. 1(a). In this case, the electronic device can use a three-dimensional reconstruction technology to correct the angle of the face in the image. For another example, during video surveillance, it is necessary to correct an angle of a face in a surveillance picture to improve accuracy of face recognition. In this case, the electronic device can also use a three-dimensional reconstruction technology to correct the angle of the face in the image. The three-dimensional reconstruction technology is generally based on a recognized facial feature. For example, the face shown in FIG. 1(b) is reconstructed and adjusted. The adjusted facial image may be shown in FIG. 1(c). It can be learned that in any one of the foregoing scenes, to improve quality of a video call or improve an effect of processing an image by the electronic device, so as to obtain a more accurate facial feature and the like, a technology for three-dimensional reconstruction of a facial image is used. A facial effect obtained by using the three-dimensional reconstruction technology mainly depends on accurate recognition of a feature point in the facial feature.

Figure 2:
FIG. 2 is a schematic diagram of facial deformation of three-dimensional reconstruction due to failure of a facial feature according to an embodiment of this application.
Figure 2:
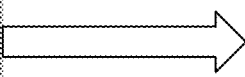
Figure 2:

In the process of three-dimensional reconstruction of the facial image, if a head posture angle is excessively large, for example, an upward elevation angle of the face is excessively large or a depression angle is excessively large, or a feature point in the collected facial image is close to an edge of the facial image, or a face moves too fast during collection of the facial image, real-time tracking of a feature point in the facial feature fails, and so on. This leads to inaccurate recognition of the feature point in the facial feature, and consequently an effect of correcting the face angle later is poor, for example, as shown in FIG. 2.

Based on this, the technical solutions provided in the embodiments of this application can well resolve the problem that in any one of the foregoing scenes, when the electronic device performs three-dimensional reconstruction processing on the captured facial image, recognition of a feature point in the facial feature is inaccurate, resulting in a poor effect of correcting the face angle later. The main idea is to determine, by using the facial feature in the recognized video image, posture information used to represent a current head posture angle and/or facial change information used to represent a position change status of the tracked character's head, so as to determine whether the recognized facial feature is an invalid feature. The invalid feature refer to an inaccurate feature point recognized.

The foregoing electronic device may be an electronic device with an image capturing function, such as a notebook computer, a mobile phone, a digital camera, or an ipad, or may be a desktop computer, a wearable device, or the like, which is not limited in the embodiments of this application. The electronic device may alternatively be a device such as a server having only an image processing function. Specifically, the electronic device has a signal source, and the signal source may be a source of processed content of the electronic device, which may be a picture or a video frame. The image source may be a network, a mobile storage medium, a camera, a camera device, or the like. The signal source is configured to input a to-be-processed video image into the electronic device, and the electronic device is configured to process the to-be-processed video image. For example, the method for determining validity of a facial feature provided by this embodiment of this application is used to determine the validity of the facial feature. For another example, when it is determined that the facial feature is valid, a face angle can be corrected based on the three-dimensional reconstruction method. In an optional case, the electronic device may have a display function, so the electronic device provided in this embodiment of this application can further display the processed video image. In this case, there is no need to output the processed video image to a display device. For example, the electronic device may be a video camera with a display function, or an intelligent terminal device such as a notebook computer or a tablet computer. In another optional case, the electronic device does not have a display function, and the electronic device outputs the processed video image to a display device. The display device herein may be a device with a display function, such as a display, or may be a display screen. The display device is configured to receive an image signal transmitted by the electronic device and display the received image signal.

For example, the signal source may be generated inside the electronic device. For example, the electronic device includes a camera for collecting an image signal. The signal source may be generated by an external device. For example, another camera device independent of the electronic device captures a facial image, and sends the captured image to the electronic device. The following description is provided by using an example in which the signal source is generated inside the electronic device.

Figure 3:
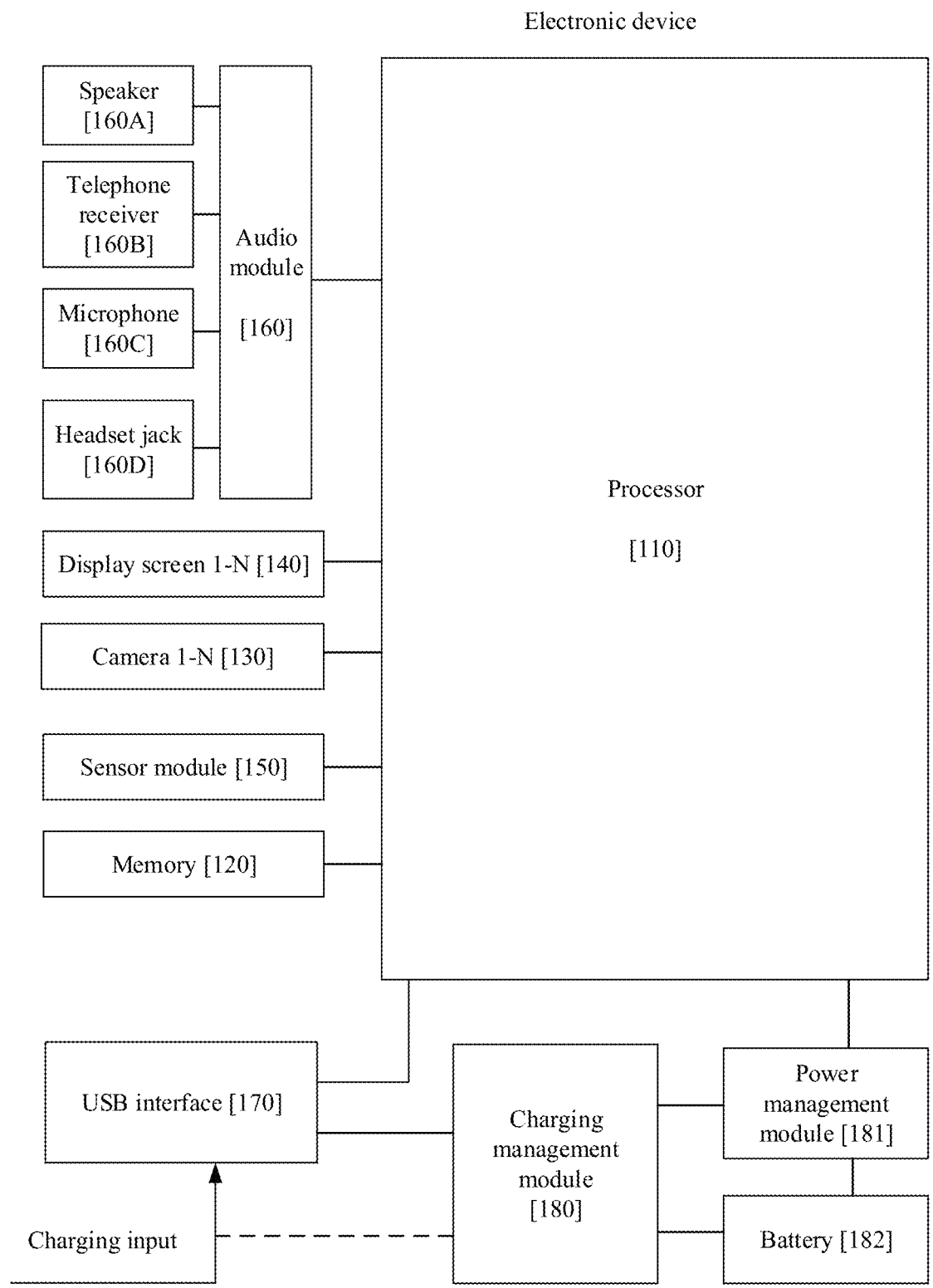
FIG. 3 is a schematic structural diagram of an electronic device according to an embodiment of this application.

The following first briefly describes a framework of an electronic device to which an embodiment of the present invention can be applied. Specifically, as shown in FIG. 3, the electronic device may include a processor 110, a memory 120, and a camera 130. The electronic device may further include a display screen 140. The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the electronic device. The controller can generate an operation control signal according to instruction operation code and a timing signal to complete control of fetching and executing an instruction.

A memory may be further arranged in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. This avoids repeated access and shortens a waiting time of the processor 110, thereby improving system efficiency.

It should be noted that the processor 110 can run software code of the method for determining validity of a facial feature provided in the embodiments of this application, to execute the process of determining the validity of the facial feature in the following description. The specific process of determining the validity of the facial feature will be described below.

The memory 120 can be configured to store computer-executable program code. The executable program code includes an instruction. By running the instruction stored in the memory 120, the processor 110 executes various function applications and data processing of the electronic device. The memory 120 may include a program storage area and a data storage area. The program storage area can store software code of an operating system and an application (such as a camera application, a WeChat application, a QQ application, or a video chat application). The data storage area can store personal data (for example, an image received before determining of the validity of the facial feature, and an image after three-dimensional reconstruction) created during the use of the electronic device.

It should be noted that the memory 120 may further store software code of the method for determining validity of a facial feature provided in the embodiments of this application. When running the code, the processor 110 executes the process of determining the validity of the facial feature in the following description to implement the function of determining the validity of the facial feature. The memory 120 may further store other content, for example, the memory 120 stores the facial feature. It should be understood that the memory 120 may further store other content mentioned below, such as the first threshold to the fifth threshold.

The memory 120 may include a high-speed random access memory, and may further include a non-volatile memory, such as at least one magnetic disk storage device, flash memory device, and universal flash storage (universal flash storage, UFS).

The display screen 140 is configured to display an image, a video, and the like, for example, configured to display a still image or a video that is obtained by the camera 130 and that has not undergone three-dimensional reconstruction, or configured to display a still image or a video after three-dimensional reconstruction. The display screen 140 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), Miniled, MicroLed, Micro-oLed, a quantum dot light-emitting diode (quantum dot light emitting diodes, QLED), and the like. In some embodiments, the electronic device may include 1 or N display screens 140, and N is a positive integer greater than 1. The display screen 140 is configured to display a home interface or display a display interface of an application, such as a display interface of a video call application. The display screen 140 may further display a video image, such as a video image after three-dimensional reconstruction during a video call.

Figure 4:
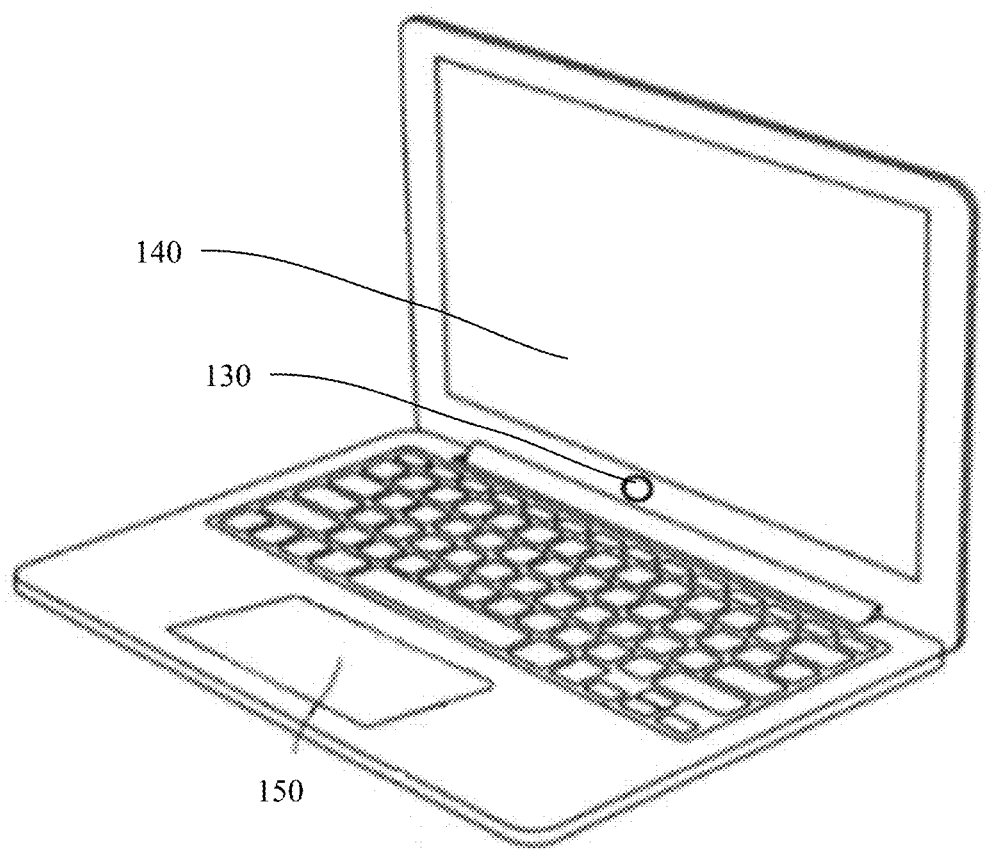
FIG. 4 is a schematic structural diagram of another electronic device according to an embodiment of this application.

Specifically, in this embodiment of this application, the camera 130 may be configured to obtain a still image or a video before three-dimensional reconstruction. For example, the electronic device is a notebook computer, which may also be referred to as a personal computer (person computer, PC). As shown in FIG. 4, the camera 130 may be arranged below the display screen 140. The camera 130 may include photosensitive elements, such as a lens group and an image sensor. The lens group includes a plurality of lenses (convex lenses or concave lenses) for collecting light signals reflected by a to-be-photographed object and transmitting the collected light signals to the image sensor. The image sensor generates an image of the to-be-photographed object based on the light signals.

The electronic device may further include a touch sensor 150, which is also referred to as a "touch panel", as shown in FIG. 4. The touch sensor 150 is configured to detect a touch operation applicable to or near the touch sensor 150. The touch sensor 150 can transfer a detected touch operation to the processor 110 to determine a type of a touch event. A visual output related to the touch operation can be provided through the display screen 140. The electronic device may further include other input devices, such as a physical keyboard and a mouse.

The touch sensor 150 can detect the user's touch operation on the touch screen, and send the touch operation to the processor 110. Based on the touch operation, the processor 110 can determine an icon corresponding to the touch operation, that is, determine an application to be clicked by the user. The touch sensor 150 can detect the user's touch operation on the touch screen, and send the touch operation to the processor 110. Based on the touch operation, the processor 110 can determine an icon corresponding to the touch operation, that is, determine an application to be clicked by the user. Assuming that the processor 110 determines, based on the touch operation, that the user clicks on the video chat application, the processor 110 starts the camera application, displays a viewfinder interface, and starts the camera 130. The camera 130 captures a video image, and the viewfinder interface displays the video image. Certainly, the viewfinder interface further includes a video shooting control. When the touch sensor 150 detects an operation for triggering the shooting control, the camera 130 collects a video image.

Similarly, the electronic device may alternatively receive an input operation through a physical keyboard, and send the input operation to the processor 110. The processor 110 determines an icon corresponding to the input operation, such as a video chat application. Alternatively, the electronic device may receive an input operation through a mouse, and send the input operation to the processor 110. The processor 110 determines an icon corresponding to the input operation.

As shown in FIG. 3, the electronic device may further include an audio module 160, a speaker 160A, a telephone receiver 160B, a microphone 160C, and an earphone jack 160D to implement audio functions, such as music playing and sound recording.

The audio module 160 is configured to convert digital audio information into an analog audio signal for output, and is further configured to convert an analog audio input into a digital audio signal. The audio module 160 can be further configured to encode and decode audio signals. In some embodiments, the audio module 160 may be arranged in the processor 110, or some of the functional modules of the audio module 160 may be arranged in the processor 110.

The speaker 160A, also referred to as a "horn", is configured to convert an audio electrical signal into a sound signal. The electronic device can listen to music through the speaker 160A, or listen to a hands-free call.

The telephone receiver 160B, also referred to as a "handset", is configured to convert an audio electrical signal into a sound signal. When the electronic device receives a call or voice message, the telephone receiver 160B can be placed close to an ear to receive the voice.

The microphone 160C, also referred to as a "mike", is configured to convert a sound signal into an electrical signal. When making a call or sending a voice message, the user can make the mouth approach the microphone 160C and emit a sound, so as to input a sound signal into the microphone 160C. The electronic device 100 may be provided with at least one microphone 160C. In some other embodiments, the electronic device may be provided with two microphones 160C, which can implement noise reduction function in addition to collecting sound signals. In some other embodiments, the electronic device may alternatively be provided with three, four, or more microphones 160C to implement sound signal collection, noise reduction, sound source recognition, directional recording, and the like functions.

The earphone jack 160D is configured to connect a wired earphone. The earphone jack 160D may be a USB interface 170, or may be a 3.5 mm open mobile terminal platform (open mobile terminal platform, OMTP) standard interface, a cellular telecommunications industry association of the USA (cellular telecommunications industry association of the USA, CTIA) standard interface, or the like.

A charging management module 180 is configured to receive a charging input from a charger. The charger may be a wireless charger or a wired charger. In some embodiments of wired charging, the charging management module 180 can receive a charging input of the wired charger through the USB interface. In some embodiments of wireless charging, the charging management module 180 can receive a wireless charging input through a wireless charging coil of the electronic device. When charging a battery 182, the charging management module 180 can also supply power to the electronic device through a power management module 181 at the same time.

The power management module 181 is configured to connect the battery 182, the charging management module 180, and the processor 110. The power management module 181 receives an input from the battery 182 and/or the charging management module 180, and supplies power to the processor 110, the display screen 140, the camera 130, and the like. The power management module 181 can be further configured to monitor parameters such as a battery capacity, battery cycle times, and a battery health status (leakage and impedance). In some other embodiments, the power management module 181 may alternatively be arranged in the processor 110. In some other embodiments, the power management module 181 and the charging management module 180 may alternatively be arranged in the same device.

Although not shown in FIG. 3, the electronic device may further include a pressure sensor, a gyroscope sensor, a barometric pressure sensor, a magnetic sensor, an acceleration sensor, a distance sensor, an ambient light sensor, a fingerprint sensor, a temperature sensor, and the like. In addition, the electronic device may further include an indicator such as an indicator light, which is used to indicate a charging status, a power change, a message, a notification, and the like.

With reference to an architectural diagram of the electronic device shown in FIG. 3, and by using a scene of video chatting by the electronic device as an example, the following describes in detail a method for determining validity of a feature obtained in a process of capturing a video image by the electronic device and performing three-dimensional reconstruction processing on a character's face in the captured video image. In this application, the term "at least one"

means one or more than one, that is, including one, two, three, or more; and the term "a plurality of" means two or more than two, that is, including two, three, or more. In addition, it should be understood that, terms such as "first" and "second" in the descriptions of this application are used only for description purposes and should not be understood as an indication or implication of relative significance or as an indication or implication of an order. The term "and/or" describes an association relationship between associated objects, and indicates that three relationships may exist. For example, A and/or B may represent the following three cases: Only A exists, both A and B exist, and only B exists. A and B may be singular or plural. The character "/" generally indicates an "or" relationship between associated objects. "At least one of the following items" or a similar expression means any combination of these items, including any combination of a single item or a plurality of items. For example, "at least one of a, b, or c" may represent a, b, c, a-b, a-c, b-c, or a-b-c, where a, b, and c may be singular or plural.

Figure 5:
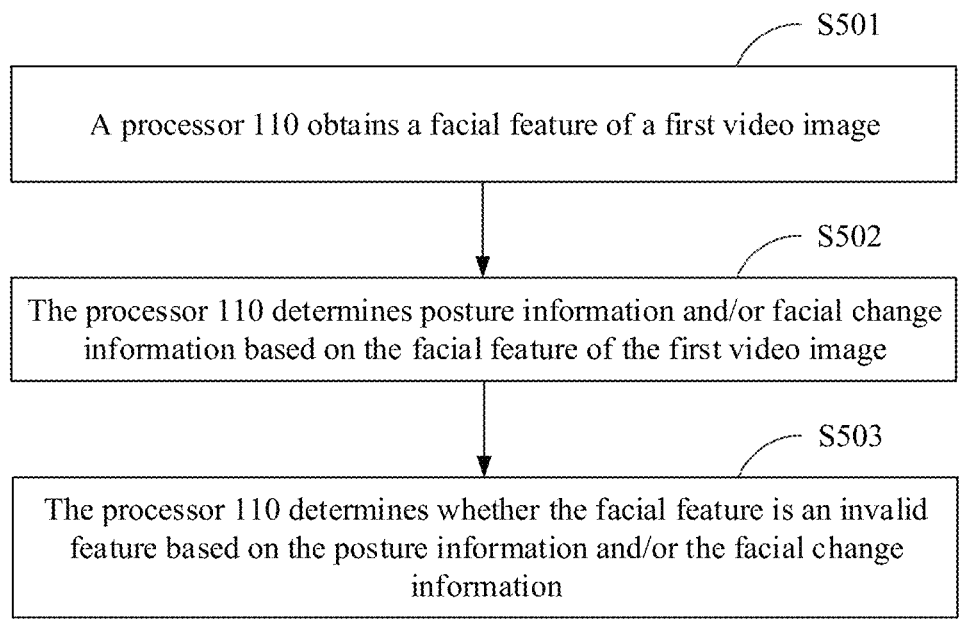
FIG. 5 is a schematic flowchart of a method for determining validity of a facial feature according to an embodiment of this application.

The following describes a method for determining validity of a facial feature provided in an embodiment of this application with reference to FIG. 5. The method can be performed by an electronic device, and specifically can be performed by a processor 110 of the electronic device. For example, when the processor 110 in the electronic device receives an input instruction for video chatting triggered by a user, the processor 110 starts a camera to collect a video image, and determines validity of a facial feature extracted from the video image, and performs three-dimensional reconstruction on a character's face based on a determining result, and displays the video image after three-dimensional reconstruction on the display screen 140. For example, the processor 110 may invoke the camera to collect a video image, and instruct the display screen 140 to display the video image after three-dimensional reconstruction in the video chatting interface. The processor 110 executes the following method procedure for determining validity of a facial feature for the video image collected by the camera.

S501: The processor 110 obtains a facial feature of a first video image.

In this embodiment of this application, for ease of description, a to-be-processed video image collected by the current camera 130 is referred to as a first video image, and a frame of image preceding the first video image in a video stream to which the first video image belongs is referred to as a second video image, and a quantity of video images between the second video image and the first video image is within a preset quantity range. For example, the preset quantity range is 0-8. When the preset quantity range is 0, the second video image is a frame of image directly preceding the first video image. When the preset quantity range is 1, the second video image is a video image that precedes the first video image and is spaced apart from the first video image by one frame.

The processor 110 can obtain the facial feature in a manner of tracking a face in a video stream, or in a feature extraction manner, which is not limited in this application.

S502: The processor 110 determines posture information and/or facial change information based on the facial feature of the first video image.

The posture information is used to represent deflection of a character's head indicated by the facial feature in the first video image, and the facial change information is used to represent a position change status of the character's head in the first video image and a second video image. For example, the posture information may include at least one of horizontal deflection used to represent left or right turning of the character's head, vertical deflection used to represent raising or lowering of the character's head, and inclination used to represent a skew degree of the character's head. The facial change information may include at least one of displacement of a position of the character's head in the first video image relative to a position of the character's head in the second video image, and an image similarity between a facial image of the first video image and a facial image of the second video image.

S503: The processor 110 determines whether the facial feature of the first video image is an invalid feature based on the posture information and/or the facial change information.

In an example, the processor 110 can determine whether the facial feature is an invalid feature based on the posture information and/or the facial change information in the following manner:

The processor 110 determines that the facial feature in the first video image is an invalid feature when determining that at least one of the following condition 1 to condition 5 is met.

Condition 1: The displacement of the position of the character's head in the first video image relative to the position of the character's head in the second video image included in the facial change information is greater than a first threshold.

Condition 2: The image similarity between the facial image of the first video image and the facial image of the second video image included in the facial change information is greater than a second threshold.

Condition 3: The horizontal deflection used to represent left or right turning of the character's head included in the posture information is greater than a third threshold.

Condition 4: The vertical deflection used to represent raising or lowering of the character's head included in the posture information is greater than a fourth threshold.

Condition 5: The inclination used to represent a skew degree of the character's head included in the posture information is greater than a fifth threshold.

For example, the first threshold, the second threshold, the third threshold, the fourth threshold, and the fifth threshold may be pre-configured values, for example, the first threshold, the second threshold, the third threshold, the fourth threshold, and the fifth threshold are pre-stored in the memory 120. For example, the first threshold and the second threshold may be determined based on a requirement of a three-dimensional reconstruction model for a short-term facial motion range. For example, when the motion range is large and the motion is fast, and when a facial angle is corrected using the three-dimensional reconstruction model, the face is deformed. For example, the third threshold can be determined based on a requirement of the three-dimensional reconstruction model for a face angle of left or right head turning. For example, when the left or right head turning angle is large, and when a facial angle is corrected using the three-dimensional reconstruction model, the face is deformed. For example, the fourth threshold can be determined based on a requirement of the three-dimensional reconstruction model for a face angle of raising or lowering the head. For example, when the angle of raising or lowering the head is large, and when a facial angle is corrected using the three-dimensional reconstruction model, the face is deformed. For example, the fifth threshold can be determined based on a requirement of the three-dimensional reconstruction model for a face angle of head skewing. For example, when the angle of head skewing is large, and when a facial angle is corrected using the three-dimensional reconstruction model, the face is deformed.

For example, determining whether the facial feature of the video image in the video stream is an invalid feature is used as an example, that is, the first video image is an image in the video stream. During the determining, the facial change information may be referred to. The determining may be performed based on the facial change information, or based on the posture information and the facial change information. For example, when it is determined that any one of condition 1 to condition 5 is met, it is determined that the facial feature in the video image in the video stream is an invalid feature. When it is determined that none of condition 1 to condition 5 is met, it is determined that the facial feature in the video image in the video stream is a valid feature. For another example, determining whether a facial feature of a single video image (the video image is not an image in the video stream, but an image shot separately) is an invalid feature is used as an example, that is, the first video image is an image shot separately. During the determining of whether the facial feature of the first video image is an invalid feature, the facial change information is not referred to, and in this case, the determining can be performed based only on the posture information. For example, when it is determined that any one of condition 3 to condition 5 is met, it is determined that the facial feature of the first video image is an invalid feature. When it is determined that none of condition 3 to condition 5 is met, it is determined that the facial feature of the first video image is a valid feature.

It should be understood that, when it is determined that at least one of the following conditions is met, an order of determining the conditions may not be configured, or certainly, the order of determining the conditions may be configured, which is not limited in this embodiment of this application. When the order of determining the conditions is configured, for example, the order of condition 1->condition 2->condition 3->condition 4->condition 5 is configured for determining. Condition 1 is first determined, and when condition 1 is met, it is determined that the facial feature of the first video image is an invalid feature. In this case, condition 2 to condition 5 may be no longer determined. When condition 1 is not met, it is determined whether condition 2 is met, and so on.

In addition, when the order of determining the conditions is configured, a parameter required for determining a condition can be determined based on the order of determining the conditions. Then it is determined, based on the parameter, whether the condition is met. If the condition is not met, a parameter required for determining a next condition is determined, and then it is determined whether the next determining condition is met, and so on. For example, the order of condition 1->condition 2->condition 3->condition 4->condition 5 is configured for determining. The displacement is determined based on the facial feature of the first video image. When it is determined that the displacement does not meet condition 1, the image similarity is determined based on the facial feature of the first video image. When it is determined that the image similarity does not meet condition 2, the horizontal deflection is determined based on the facial feature of the first video image. Certainly, if it is determined that the displacement meets condition 1, it is determined that the facial feature of the first video image is an invalid feature. In this case, the determining of the image similarity based on the facial feature of the first video image is no longer performed, nor the determining of whether condition 2 is met, and so on.

During capturing of a video image, it is possible that only a part of the character's head is captured from the video image due to the character's sudden rise and other actions. Consequently, a quantity of feature points included in the captured facial feature may not meet a requirement for subsequent face angle correction. In this case, it may be determined that the obtained facial feature is an invalid feature. In an example, after obtaining the facial feature of the first video image, and before performing S502, the processor 110 may first determine that the quantity of feature points included in the facial feature is within a preset quantity range, and then perform S502, that is, determine the posture information and/or the facial change information based on the facial feature of the first video image. When determining that the quantity of facial features of the first video image is outside the preset quantity range, the processor 110 can directly determine that the obtained facial feature of the first video image is an invalid feature. In another example, after obtaining the facial feature of the first video image, and before performing S502, the processor 110 may first determine that the quantity of feature points included in the facial feature is a preset quantity threshold, and then perform S502, that is, determine the posture information and/or the facial change information based on the facial feature of the first video image. When determining that the quantity of facial features of the first video image is not the preset quantity threshold, the processor 110 can determine that the obtained facial feature of the first video image is an invalid feature. For example, 68 feature points are required for performing three-dimensional reconstruction of a character's head. If the quantity of feature points in the obtained facial feature is not 68, it is determined that the obtained facial feature is an invalid feature.

For example, the preset quantity range or the preset quantity threshold is determined according to a requirement of the three-dimensional reconstruction model for the quantity of feature points.

In an example, when the processor 110 obtains the facial feature of the first video image in a face tracking manner, the tracked feature points may exceed the image range due to the fact that the facial motion is excessively fast. Based on this, when the processor 110 obtains the facial feature of the first video image in S501, if the facial feature of the first video image includes feature points that exceed the image range, the processor 110 determines that the facial feature of the first video image is an invalid feature, and no longer performs S502.

Figure 6A:
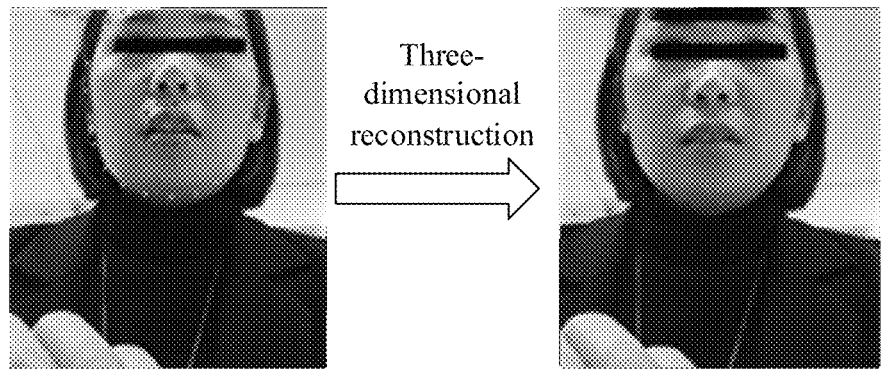
FIG. 6A is a schematic diagram of a bad result of a face after three-dimensional reconstruction according to an embodiment of this application.

In a possible implementation, during subsequent correction of the face angle, a proportion of the face in the video image may need to be decreased or increased. In this case, the processor 110 can specifically perform S502 in the following manner:

determining the posture information and/or the facial change information based on the facial feature of the first video image when the facial feature does not include a feature point located in an edge area of the first video image. For example, when the facial feature of the first video image includes a feature point located in the edge area of the first video image, the processor 110 directly determines that the facial feature of the first video image is an invalid feature point. For example, as shown in FIG. 6A, some of feature points included in an eyebrow feature are located in the edge area of the video image. Consequently, there is a black space area after the face angle is corrected by using the three-dimensional reconstruction technology.

Figure 6B:
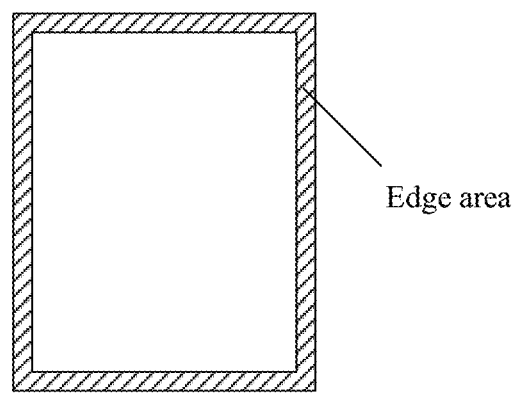
FIG. 6B is a schematic diagram of an edge area according to an embodiment of this application.

Specifically, the processor 110 can determine whether the facial feature of the first video image includes a feature point located outside the edge area of the first video image in the following manners:

Manner 1: Decreasing or increasing the proportion of the face in the video image may be indicated by a zoom factor, so that the processor 110 can determine a size of the edge area based on the zoom factor, and determine, based on the size of the edge area, whether the facial feature of the first video image includes a feature point located outside the edge area of the first video image. Refer to the edge area shown in FIG. 6B, for example.

Manner 2: The processor 110 can determine a distance threshold based on the zoom factor, and when the facial feature includes a feature point whose distance from the edge of the first video image is less than a distance threshold, determine that the facial feature of the first video image includes a feature point located outside the edge area of the first video image. When the facial feature does not include a feature point whose distance from the edge of the first video image is less than the distance threshold, it is determined that the facial feature of the first video image does not include a feature point located outside the edge area of the first video image.

Figure 6C:
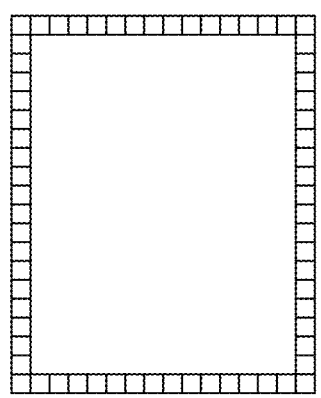
FIG. 6C is a schematic diagram of an image edge according to an embodiment of this application.

It should be noted that the edge of the image refers to a circle of pixels located at the outermost layer of the image. Refer to the edge of the image shown in FIG. 6C, for example.

The following uses examples to describe the process in which the processor 110 determines the posture information and/or the facial change information based on the facial feature of the first video image. As described above, the posture information may include at least one of horizontal deflection, vertical deflection, and inclination. The facial change information may include at least one of displacement and image similarity.

Example 1 describes a manner of determining the displacement in the facial change information based on the facial feature of the first video image.

The facial feature of the first video image obtained by the processor 110 may include N groups of feature points. The N groups of feature points may be divided based on the facial organs to which the feature points belong. N is a positive integer greater than or equal to 1, that is, different groups of feature points belong to different facial organs, and the same group of feature points belongs to the same facial organ.

Figure 7:
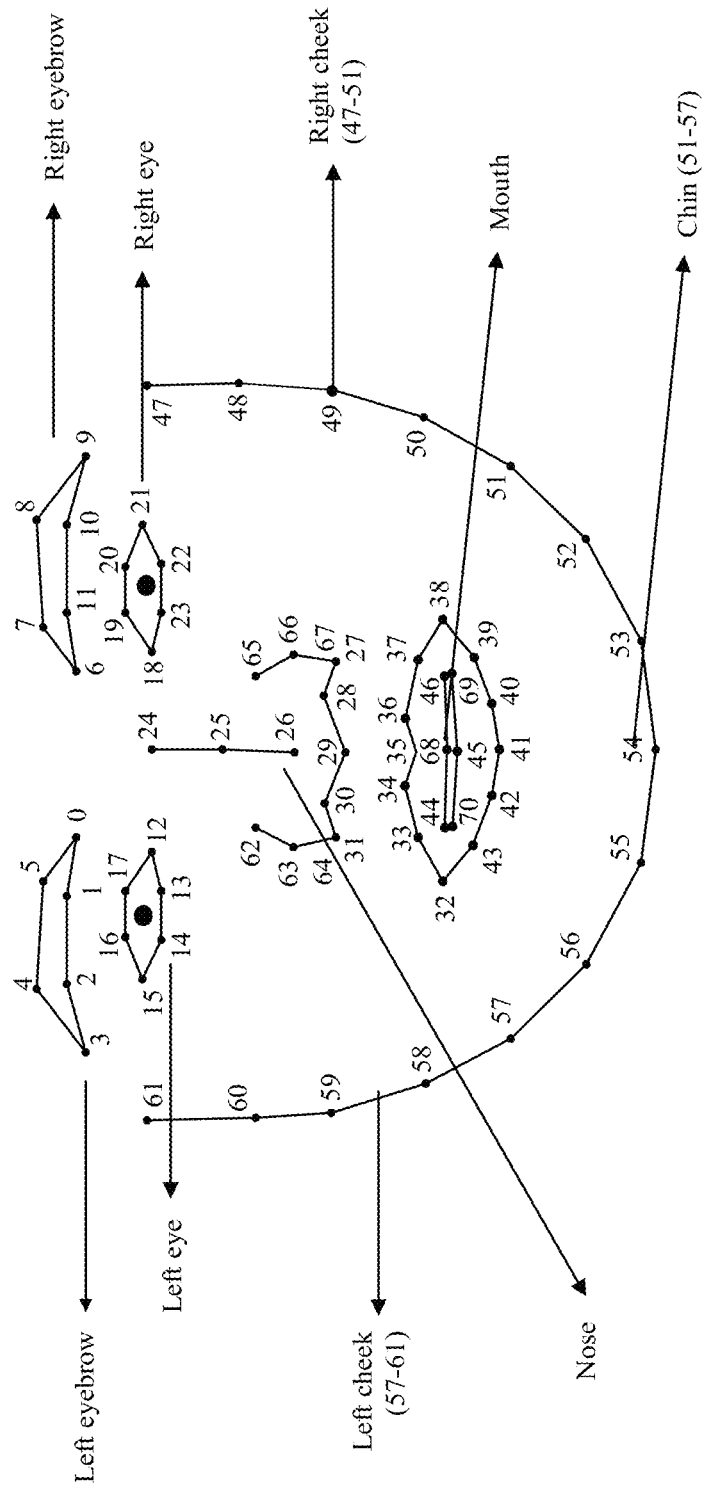
FIG. 7 is a schematic diagram of a feature point included in a facial feature according to an embodiment of this application.

For example, referring to FIG. 7, the facial features include an eyebrow feature, an eye feature, a cheek feature, a nose feature, a mouth feature, and a chin feature. In an example manner, during grouping, feature points belonging to the eyebrow feature may be classified into one group, feature points belonging to the eye feature may be classified into one group, feature points belonging to the mouth feature may be classified into one group, feature points belonging to the nose feature may be classified into one group, feature points belonging to the chin feature may be classified into one group, and feature points belonging to the cheek feature may be classified into one group. In another example manner, the eyebrows may be divided into a left eyebrow and a right eyebrow, the eyes may be divided into a left eye and a right eye, and the cheeks may be divided into a left cheek and a right cheek. During grouping, the feature points belonging to the eyebrow feature are classified into two groups, that is, the feature points belonging to the left eyebrow feature are classified into one group, and the feature points belonging to the right eyebrow feature are classified into one group; the feature points belonging to the eye feature are classified into two groups, that is, the feature points belonging to the left eye feature are classified into one group, and the feature points belonging to the right eye feature are classified into one group; the feature points belonging to the cheek feature are classified into two groups, that is, the feature points belonging to the left cheek feature are classified into one group, and the feature points belonging to the right cheek feature are classified into one group; the feature points belonging to the mouth feature are classified into one group; the feature points belonging to the nose feature are classified into one group; and the feature points belonging to the chin feature are classified into one group.

The processor 110 can determine the displacement in the facial change information based on the facial feature of the first video image in the following manner:

determining a distance between a reference point of an i-th group of feature points in the first video image and a reference point of an i-th group of feature points in the second video image to obtain N groups of distances, where i represents a positive integer less than or equal to N.

In a manner, an average value of the N groups of distances may be determined as the displacement. In another manner, an average value of the normalized N groups of distances may be determined as the displacement.

For example, the reference point of the i-th group of feature points may be a preset feature point in the i-th group of feature points, or the reference point of the i-th group of feature points may be a pixel corresponding to an average value of coordinates of the i-th group of feature points. For example, the chin feature in FIG. 7 is used as an example. The feature points included in the chin feature are feature points 51-57, and the reference point of the group to which the chin feature belongs may be one of feature points 51-57, such as feature point 54. Alternatively, an average value of horizontal coordinates of feature points 51-57 and an average value of vertical coordinates of feature points 51-57 are respectively calculated, and the pixel corresponding to the obtained coordinates in the first video image (or the second video image) is the reference point.

For example, the processor 110 can normalize the N groups of distances by using a distance between two eyes in the first video image as a reference. The distance between the two eyes may be a distance between an identified pupil of the left eye and an identified pupil of the right eye. The distance between the two eyes may alternatively be a distance between the reference point of the left eye feature and the reference point of the right eye feature in the first video image. The reference point of the left eye feature may be a pixel corresponding to an average value of feature point coordinates included in the left eye feature, and the reference point of the right eye feature may be a pixel corresponding to an average value of feature point coordinates included in the right eye feature.

Example 2 describes a manner in which the processor 110 determines the image similarity in the facial change information based on the facial feature of the first video image.

The facial feature of the obtained first video image may include M groups of feature points. The M groups of feature points may be divided based on the facial organs to which the feature points belong. M is a positive integer greater than or equal to 1, that is, different groups of feature points belong to different facial organs, and the same group of feature points belongs to the same facial organ. For example, the grouping manner of facial features in example 2 may be the same as or different from the grouping manner of facial features in example 1.

Figure 8:
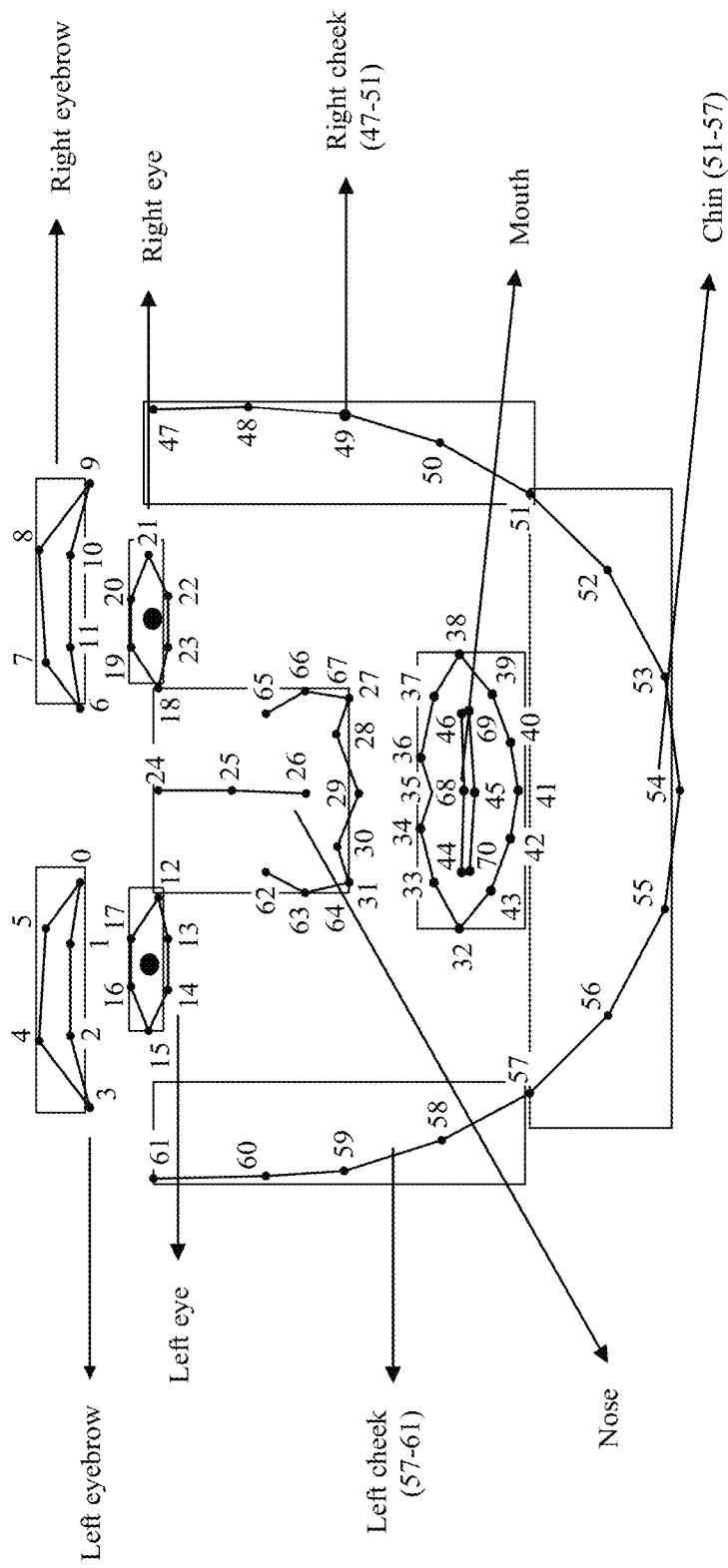
FIG. 8 is a schematic diagram of a local feature image of a facial feature according to an embodiment of this application.

After grouping the facial features, the processor 110 can obtain a local feature image of the group based on a range included in each group of feature points, for example, as shown in FIG. 8.

The determining the image similarity in the facial change information based on the facial feature of the first video image can be implemented in the following manner:

determining a similarity between a j-th local feature image in the first video image and a j-th local feature image in the second video image to obtain M similarities, where j represents a positive integer less than or equal to N; and determining an average value of the N similarities as the image similarity.

The j-th local feature image in the first video image is determined based on a range enclosed by the j-th group of feature points of the first video image. The j-th local feature image in the second video image is determined based on a range enclosed by the j-th group of feature points of the second video image.

For example, a size of the j-th local feature image in the first video image is the same as a size of the j-th local feature image in the second video image. When the size of the j-th local feature image in the first video image is different from the size of the j-th local feature image in the second video image, the size of the j-th local feature image in the first video image or the size of the j-th local feature image in the second video image may be adjusted, so that the size of the j-th local feature image in the first video image is the same as the size of the j-th local feature image in the second video image.

In an example, when the j-th local feature image in the first video image is determined based on the range enclosed by the j-th group of feature points of the first video image, a j-th image formed by the range enclosed by the j-th group of feature points of the first video image may be determined, and a difference between a pixel value of each pixel of the j-th image of the first video image and an average value of the pixels of the j-th image of the first video image is calculated, so as to obtain the j-th local feature image of the first video image. Similarly, when the j-th local feature image in the second video image is determined based on the range enclosed by the j-th group of feature points of the second video image, a j-th image formed by pixels in the range enclosed by the j-th group of feature points of the second video image may be determined, and a difference between a pixel value of each pixel of the j-th image of the second video image and an average value of the pixels of the j-th image of the second video image is calculated, so as to obtain the j-th local feature image of the second video image.

For example, the j-th image is formed by the range enclosed by the j-th group of feature points of the to-be-determined video image (the first video image or the second video image), and the j-th image includes L pixels. The j-th local feature image of the to-be-determined video image can be determined using by the following formula:

$$f_k^j(x, y) = g_k^j(x, y) - \frac{\sum_{h=1}^{L} f_h^j(x, y)}{L}$$

where $f_k^j(x,y)$ represents a pixel value of a k-th pixel of the j-th local feature image of the to-be-determined video image; $g_k^j(x,y)$ represents a pixel value of a k-th pixel of the j-th image of the to-be-determined video image.

For example, the similarity may be a mean square error, a structural similarity (structural similarity, SSIM), a signal to noise ratio (signal to noise ratio, SNR), a peak signal to noise ratio (peak signal to noise ratio, PSNR), or the like.

Example 3 describes a manner in which the processor 110 determines the horizontal deflection in the posture information based on the facial feature of the first video image. Specifically, any one of the following manners may be used:

Manner 1: The facial features include a left cheek feature, a right cheek feature, and a nose feature;

the first distance between the reference point of the left cheek feature and the reference point of the nose feature is determined, and the second distance between the reference point of the right cheek feature and the reference point of the nose feature is determined; and the ratio of the first distance to the second distance is determined as the horizontal deflection, or the ratio of the second distance to the first distance is determined as the horizontal deflection, where the reference point of the left cheek feature is a preset feature point in the left cheek feature, the reference point of the nose feature is a preset feature point in the nose feature, and the reference point of the right cheek feature is a preset feature point in the right cheek feature; or the reference point of the left cheek feature is a pixel corresponding to an average value of coordinates of the left cheek feature, the reference point of the nose feature is a pixel corresponding to an average value of feature point coordinates included in the nose feature, and the reference point of the right cheek feature is a pixel corresponding to an average value of feature point coordinates included in the right cheek feature; or the reference point of the left cheek feature is the center pixel of a left cheek feature image formed by the range enclosed by the feature points included in the left cheek feature, the reference point of the nose feature is the center pixel of a nose feature image formed by the range enclosed by the feature points included in the nose feature, and the reference point of the right cheek feature is the center pixel of a right cheek feature image formed by the range enclosed by the feature points included in the right cheek feature.

Manner 2: The facial features include a nasal tip point and a nasal saddle point;

three-dimensional coordinates of the nasal tip point and the nasal saddle point in the facial feature are obtained; specifically, the three-dimensional coordinates of the nasal tip point and the nasal saddle point in the facial feature can be determined based on a conversion relationship between the image coordinate system and the camera coordinate system; and the horizontal deflection is determined based on the three-dimensional coordinates of the nasal tip point and the nasal saddle point. For example, the three-dimensional coordinates of the nasal tip point are (xn, yn, zn), and the three-dimensional coordinates of the nasal saddle point are (xs, ys, zs). Specifically, the horizontal deflection can be determined by using the following formula, where Xw represents the horizontal deflection.

$$Xw = \arctan\left(\frac{xn - xs}{zn - zs}\right)$$

Example 4 describes a manner of determining the vertical deflection in the posture information based on the facial feature of the first video image. Specifically, any one of the following manners may be used:

Manner 1: The facial features include an eye feature, a chin feature, and a nose feature;

the third distance between the reference point of the eye feature and the reference point of the nose feature is determined, and the fourth distance between the reference point of the chin feature and the reference point of the nose feature is determined; and the ratio of the third distance to the fourth distance is determined as the horizontal deflection, or the ratio of the fourth distance to the third distance is determined as the vertical deflection, where the reference point of the eye feature is a preset feature point in the eye feature, the reference point of the nose feature is a preset feature point in the nose feature, and the reference point of the chin feature is a preset feature point in the chin feature; or the reference point of the eye feature is a pixel corresponding to an average value of feature point coordinates included in the eye feature, the reference point of the nose feature is a pixel corresponding to an average value of feature point coordinates included in the nose feature, and the reference point of the chin feature is a pixel corresponding to an average value of feature point coordinates included in the chin feature; or the reference point of the eye feature is the center pixel of a left cheek feature image formed by the range enclosed by the feature points included in the eye feature, the reference point of the nose feature is the center pixel of a nose feature image formed by the range enclosed by the feature points included in the nose feature, and the reference point of the chin feature is the center pixel of a right cheek feature image formed by the range enclosed by the feature points included in the chin feature.

Manner 2: The facial features include a nasal tip point and a nasal saddle point;

three-dimensional coordinates of the nasal tip point and the nasal saddle point in the facial feature are obtained; specifically, the three-dimensional coordinates of the nasal tip point and the nasal saddle point in the facial feature can be determined based on a conversion relationship between the image coordinate system and the camera coordinate system; and the horizontal deflection is determined based on the three-dimensional coordinates of the nasal tip point and the nasal saddle point. For example, the three-dimensional coordinates of the nasal tip point are (xn, yn, zn), and the three-dimensional coordinates of the nasal saddle point are (xs, ys, zs). Specifically, the vertical deflection can be determined by using the following formula, where Yw represents the vertical deflection.

$$Yw = \arctan\left(\frac{(xn - xs)^2 + (zn - zs)^2}{(zn - zs)^2}\right)$$

Example 5 describes a manner of determining the inclination in the posture information based on the facial feature of the first video image.

The facial features include a left eye feature and a right eye feature. Specifically, the inclination can be determined in the following manner:

determining an angle in the horizontal direction of an offset of a connection line between the reference point of the left eye feature and the reference point of the right eye feature as the inclination, where the reference point of the left eye feature is a pixel corresponding to an average value of feature point coordinates included in the left eye feature, and the reference point of the right eye feature is a pixel corresponding to an average value of feature point coordinates included in the right eye feature; or the reference point of the left eye feature is a left eye pupil feature point in the left eye feature, and the reference point of the right eye feature is a right eye pupil feature point in the right eye feature; or the reference point of the left eye feature is the center pixel of a left eye feature image formed by the range enclosed by the feature points included in the left eye feature, and the reference point of the right eye feature is the center pixel of a right eye feature image formed by the range enclosed by the feature points included in the right eye feature.

For example, the reference point coordinates of the left eye feature are (x1, y1), and the reference point coordinates of the right eye feature are (x2, y2). The inclination Zw can be determined by using the following formula:

$$Zw = \arctan\left(\frac{y2 - y1}{x2 - x1}\right)$$

With reference to a specific application scene, the following describes in detail the solution provided in this embodiment of this application.

The application to a video shooting scene is used as an example, and the correction of the face angle in the video image captured by the camera 130 is used as an example to describe in detail the implementation process of this application by using the three-dimensional reconstruction technology such as a 3DMM model to determine the validity of the facial feature before the face angle correction. Because the effect of the 3DMM technology on the three-dimensional face reconstruction is based on the validity of the facial feature, the validity of the facial feature needs to be first determined. For example, when a feature point is invalid, three-dimensional reconstruction may not be performed on the frame of video image, so as to prevent a bad reconstruction result (as shown in FIG. 2), thereby enhancing user experience.

Figure 9:
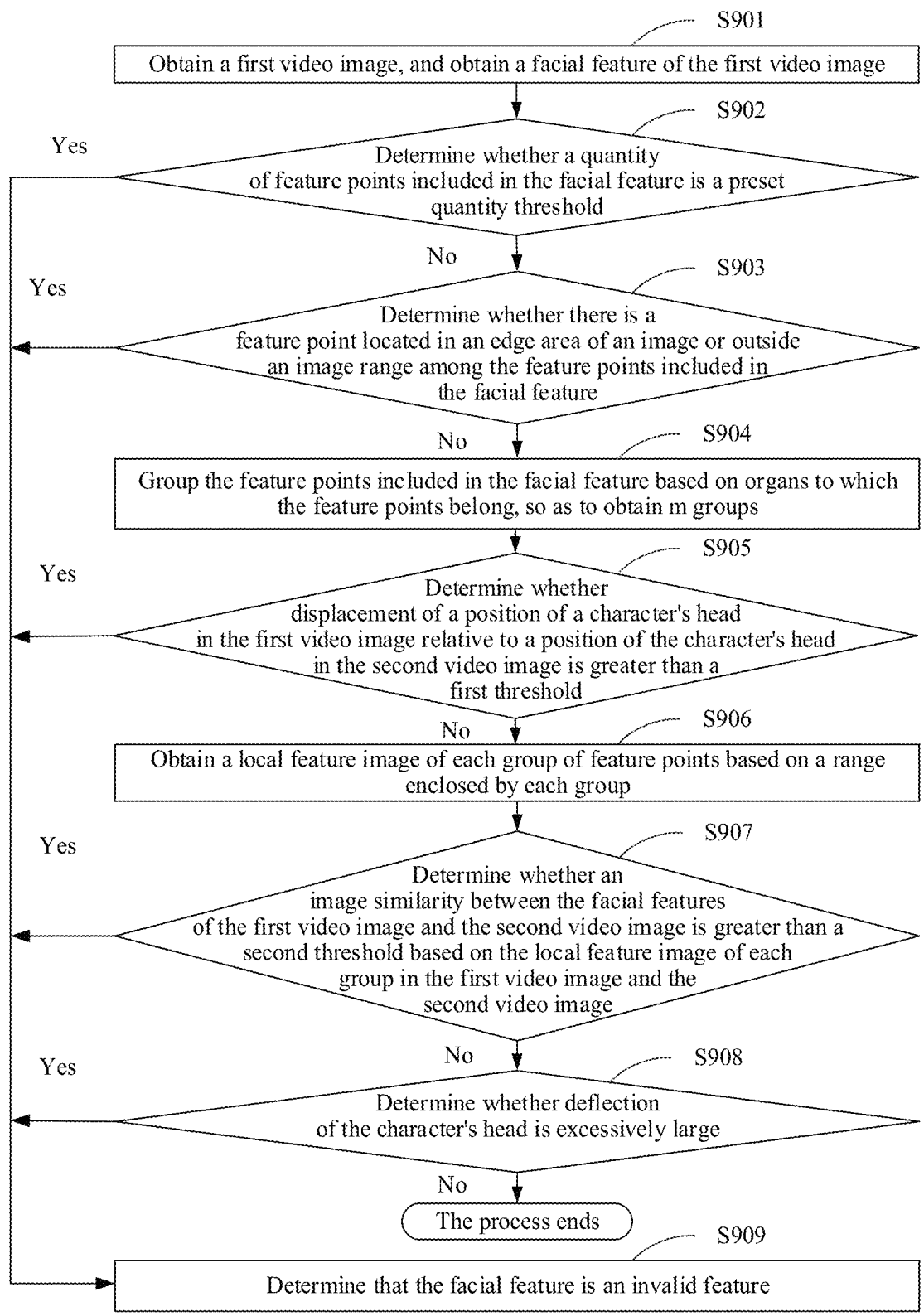
FIG. 9 is a schematic flowchart of another method for determining validity of a facial feature according to an embodiment of this application.

FIG. 9 is a schematic flowchart of a method for determining validity of a facial feature. The method can be performed by an electronic device, or be performed by a processor 110 in the electronic device. For example, the camera 130 collects a frame of video image in a video stream, and then inputs the frame of video image into the processor 110. The processor 110 determines validity of a facial feature. For ease of description, a to-be-processed video image in this embodiment is also referred to as a first video image, and a frame of image preceding the first video image in the video stream is referred to as a second video image. In addition, in FIG. 9, configuring an execution order of multiple conditions is used as an example for illustration. The order of condition 1->condition 2->condition 3->condition 4->condition 5 is only an example, and does not specifically limit the specific execution order of condition 1 to condition 5. The method may include the following steps:

S901: Obtain a first video image, and obtain a facial feature of the first video image. For example, the facial features include a left cheek feature, a right cheek feature, a nose feature, a mouth feature, a left eye feature, a right eye feature, a left eyebrow feature, and a right eyebrow feature.

S902: Determine whether a quantity of feature points included in the facial feature is a preset quantity threshold. If yes, S909 is performed. If no, S903 is performed. S902 is only an example. Alternatively, it can be determined, based on a preset quantity range, whether the quantity of feature points included in the facial feature meets a requirement for three-dimensional reconstruction. FIG. 9 uses the preset quantity threshold as an example.

S903: Determine whether there is a feature point located in an edge area of an image or outside an image range among the feature points included in the facial feature. If yes, S909 is performed. If no, S904 is performed.

S904: Group the feature points included in the facial feature based on the organs to which the feature points belong, so as to obtain m groups. For example, as shown in FIG. 8, the m groups are eight groups, including a left cheek feature group, a right cheek feature group, a nose feature group, a mouth feature group, a left eye feature group, a right eye feature group, a left eyebrow feature group, and a right eyebrow feature group.

Figure 10:
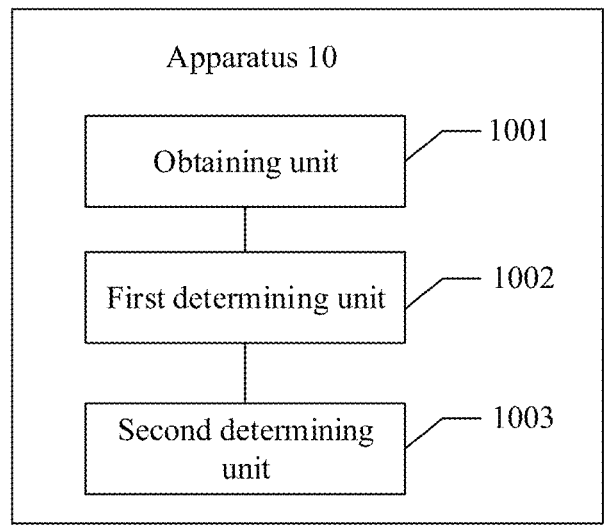
FIG. 10 is a schematic structural diagram of an apparatus 10 according to an embodiment of this application.

After the grouping is completed, reference points of these groups of feature points are obtained. In the embodiment shown in FIG. 9, the reference point of a group of feature points is a pixel corresponding to an average value of coordinates of the feature points included in the group, for example, as shown in FIG. 10.

S905: Determine whether displacement of a position of a character's head in the first video image relative to a position of the character's head in the second video image is greater than a first threshold. If yes, S909 is performed. If no, S906 is performed.

For example, a distance between a reference point of an i-th group of feature points in the first video image and a reference point of an i-th group of feature points in the second video image is determined to obtain m groups of distances, where i represents a positive integer less than or equal to m. To eliminate impact of a distance between the character's head and a screen on an image size, the m groups of distances can be normalized. For example, normalization is performed by using a distance between the reference point of the left eye and the reference point of the right eye in the first video image as a reference, to obtain normalized m groups of distances. An average value of the normalized m groups of distances is determined as the displacement of the position of the character's head in the first video image relative to the position of the character's head in the second video image.

S906: Obtain a local feature image of each group of feature points based on a range enclosed by each group.

For example, images formed by the ranges enclosed by groups of feature points of the first video image and the second video image are corresponding one by one, and are transformed into the same size. A pixel value of each pixel in each image after the size transformation minus an average pixel value of the image, thereby eliminating impact of light intensity, and obtaining a local feature image of each group.

S907: Determine whether an image similarity between the facial features of the first video image and the second video image is greater than a second threshold based on the local feature image of each group in the first video image and the second video image. If yes, S909 is performed. If no, S908 is performed.

For example, the similarity is determined based on a mean square error. Mean square error of local feature images of the same organ group of the first video image and the second video image are obtained. If an average value of the mean square errors of all the local feature images is greater than the second threshold, it can be determined that the parts shown in the local area images of the same parts greatly change, the feature point tracking is inaccurate, and the facial feature is invalid.

S908: Determine whether deflection of the character's head is excessively large. If no, the process ends. If yes, S909 is performed.

For example, the deflection of the character's head may include horizontal deflection, vertical deflection, and inclination. A specific calculation manner has been described above, and details are not described herein again.

For example, it is determined whether the deflection of the character's head is excessively large. Specifically, when it is determined that any one of the following conditions is met, it is determined that the deflection of the character's head is excessively large:

condition 3: the horizontal deflection is greater than a third threshold;

condition 4: the vertical deflection is greater than a fourth threshold; or condition 5: the inclination is greater than the fifth threshold.

S909: Determine that the facial feature is an invalid feature.

For example, when determining that the first video image is an invalid feature, the processor 110 may not perform three-dimensional reconstruction processing on the first video image, but display the first video image to the user through the display screen 140. When determining that the first video image is a valid feature, the processor 110 may perform three-dimensional reconstruction processing on the first video image, and display the first video image after the three-dimensional reconstruction processing to the user through the display screen 140.

Based on the same concept as the foregoing method, an embodiment of this application further provides an apparatus 10. As shown in FIG. 10, the apparatus 1100 may be specifically a processor in an electronic device, or a chip or a chip system, or a module in an electronic device, or the like. For example, the apparatus may include an obtaining unit 1001, a first determining unit 1002, and a second determining unit 1003. The obtaining unit 1001, the first determining unit 1002, and the second determining unit 1003 are configured to perform the method steps shown in the embodiments corresponding to FIG. 5 and FIG. 9. For example, the obtaining unit 1001 can be configured to obtain a facial feature of a first video image. The first determining unit 1002 is configured to determine posture information and/or facial change information based on the facial feature. The second determining unit 1003 is configured to determine whether the facial feature is an invalid feature based on the posture information and/or the facial change information.

Figure 11:
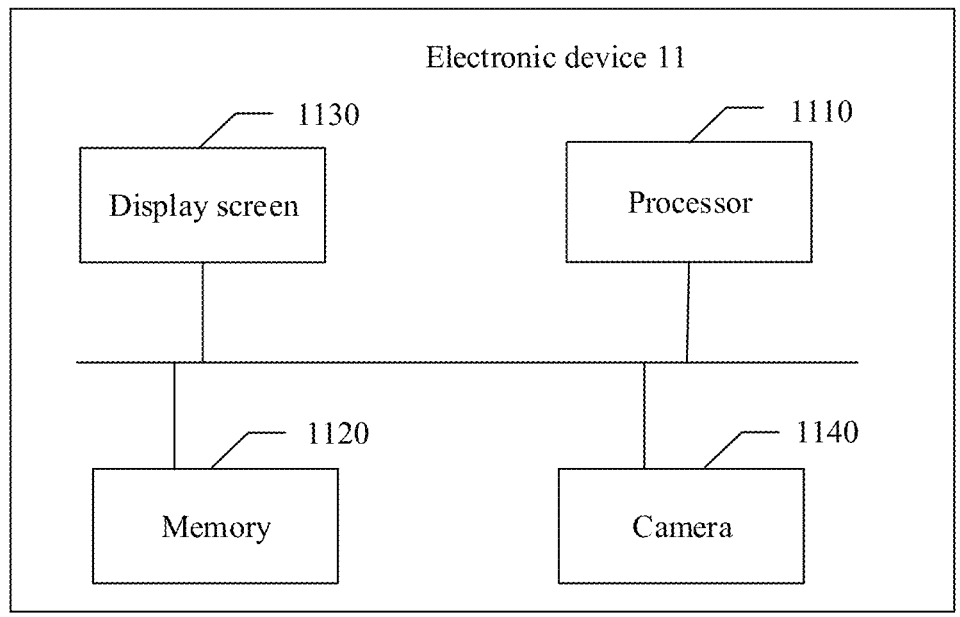
FIG. 11 is a schematic structural diagram of an electronic device 11 according to an embodiment of this application.

An embodiment of this application further provides an electronic device. As shown in FIG. 11, the electronic device 11 may include a processor 1110. Optionally, the electronic device 11 may further include a memory 1120. The memory 1120 may be arranged inside the electronic device 11 or may be arranged outside the electronic device 11. The obtaining unit 1001, the first determining unit 1002, and the second determining unit 1003 shown in FIG. 10 may be all implemented by the processor 1110. Optionally, the apparatus 11 may further include a display screen 1130 and a camera 1140. The processor 1110 is coupled to the memory 1120, the display screen 1130, and the camera 1140. Couplings in this embodiment of this application are indirect couplings or communication connections between apparatuses, units, or modules, and may be electrical, mechanical, or in another form, and are used for information exchange between the apparatuses, the units, or the modules. It should be noted that the display screen and the camera in this embodiment of this application may or may not be located on the electronic device. For example, the display screen and/or the camera may be used as an external device to connect to the electronic device.

Specifically, the memory 1120 is configured to store a program instruction. The display screen 1130 is configured to display a photo preview interface, and the photo preview interface includes an image collected by the camera 1140. The processor 1110 is configured to invoke the program instruction stored in the memory 1120, so that the electronic device 1100 performs the steps performed by the electronic device in the method for determining validity of a facial feature shown in FIG. 5 and FIG. 9.

It should be understood that the electronic device 1100 can be configured to implement the method for determining validity of a facial feature shown in FIG. 5 and FIG. 9 in this embodiment of this application. For related features, refer to the foregoing description. Details are not described herein again.

A person skilled in the art should understand that the embodiments of this application may be provided as a method, a system, or a computer program product. Therefore, this application can use a form of hardware only embodiments, software only embodiments, or embodiments with a combination of software and hardware. Moreover, this application can use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A method for determining validity of a facial feature, comprising:

obtaining, by an electronic device, a facial feature of a first video image;

determining, by the electronic device, posture information and facial change information based on the facial feature of the first video image, wherein the posture information represents deflection of a character's head indicated by the facial feature in the first video image, the facial change information represents a position change status of the character's head in the first video image and a second video image, the facial change information comprises at least one of displacement of a position of the character's head in the first video image relative to a position of the character's head in the second video image, or an image similarity between a facial image of the first video image and a facial image of the second video image, the second video image is a frame of image preceding the first video image in a video stream to which the first video image belongs, and a quantity of video images between the second video image and the first video image is within a preset quantity range, wherein the facial feature comprises N groups of feature points, wherein N is a positive integer greater than or equal to 1, different groups of feature points belong to different facial organs, and wherein the displacement in the facial change information is determined based on:

determining, by the electronic device, a distance between a reference point of an i-th group of feature points in the first video image and a reference point of an i-th group of feature points in the second video image to obtain N groups of distances, wherein i represents a positive integer less than or equal to N; and determining, by the electronic device, an average value of the N groups of distances as the displacement, or determining an average value of the normalized N groups of distances as the displacement; and determining, by the electronic device, whether the facial feature is an invalid feature based on the posture information and the facial change information.

2. The method according to claim 1, wherein the determining, by the electronic device, posture information and facial change information based on the facial feature of the first video image comprises:

determining, by the electronic device, the posture information and the facial change information based on the facial feature of the first video image when the facial feature does not include a feature point located in an edge area of the first video image.

3. The method according to claim 1, wherein the posture information comprises at least one of horizontal deflection used to represent left or right turning of the character's head, vertical deflection used to represent raising or lowering of the character's head, and inclination used to represent a skew degree of the character's head.

4. The method according to claim 3, wherein the determining, by the electronic device, whether the facial feature is an invalid feature based on the posture information and the facial change information comprises:
   determining, by the electronic device, that the facial feature in the first video image is an invalid feature when it is determined that at least one of the following conditions is met:
   the displacement is greater than a first threshold;
   the image similarity is greater than a second threshold;
   the horizontal deflection is greater than a third threshold;
   the vertical deflection is greater than a fourth threshold; or
   the inclination is greater than a fifth threshold.

5. The method according to claim 3, wherein the facial feature comprises a left cheek feature, a right cheek feature, and a nose feature; and
   wherein the horizontal deflection is determined based on:
   determining, by the electronic device, a first distance between a reference point of the left cheek feature and a reference point of the nose feature, and a second distance between a reference point of the right cheek feature and a reference point of the nose feature; and
   determining, by the electronic device, a ratio of the first distance to the second distance as the horizontal deflection, or determining a ratio of the second distance to the first distance as the horizontal deflection, wherein
   the reference point of the left cheek feature is a preset feature point in the left cheek feature, the reference point of the nose feature is a preset feature point in the nose feature, and the reference point of the right cheek feature is a preset feature point in the right cheek feature; or
   the reference point of the left cheek feature is a pixel corresponding to an average value of feature point coordinates comprised in the left cheek feature, the reference point of the nose feature is a pixel corresponding to an average value of feature point coordinates comprised in the nose feature, and the reference point of the right cheek feature is a pixel corresponding to an average value of feature point coordinates comprised in the right cheek feature.

6. The method according to claim 3, wherein the facial feature comprises an eye feature, a chin feature, and a nose feature; and
   wherein the vertical deflection is determined based on:
   determining, by the electronic device, a third distance between a reference point of the eye feature and a reference point of the nose feature, and a fourth distance between a reference point of the chin feature and a reference point of the nose feature; and
   determining, by the electronic device, a ratio of the third distance to the fourth distance as the horizontal deflection, or determining a ratio of the fourth distance to the third distance as the vertical deflection, wherein
   the reference point of the eye feature is a preset feature point in the eye feature, the reference point of the nose feature is a preset feature point in the nose feature, and the reference point of the chin feature is a preset feature point in the chin feature; or
   the reference point of the eye feature is a pixel corresponding to an average value of feature point coordinates comprised in the eye feature, the reference point of the nose feature is a pixel corresponding to an average value of feature point coordinates comprised in the nose feature, and the reference point of the chin feature is a pixel corresponding to an average value of feature point coordinates comprised in the chin feature.

7. The method according to claim 3, wherein the facial feature comprises a left eye feature and a right eye feature; and
   wherein the inclination is determined based on:
   determining, by the electronic device, an angle in the horizontal direction of an offset of a connection line between a reference point of the left eye feature and a reference point of the right eye feature as the inclination, wherein
   the reference point of the left eye feature is a pixel corresponding to an average value of feature point coordinates comprised in the left eye feature, and the reference point of the right eye feature is a pixel corresponding to an average value of feature point coordinates comprised in the right eye feature; or the reference point of the left eye feature is a left eye pupil feature point in the left eye feature, and the reference point of the right eye feature is a right eye pupil feature point in the right eye feature.

8. The method according to claim 1, wherein the facial feature comprises M groups of feature points, wherein M is a positive integer greater than or equal to 1, and different groups of feature points belong to different facial organs; and
   wherein the image similarity is determined based on:
   determining, by the electronic device, a similarity between a j-th local feature image in the first video image and a j-th local feature image in the second video image to obtain M similarities, wherein j represents a positive integer less than or equal to M;
   the j-th local feature image in the first video image is determined based on a range enclosed by the j-th group of feature points of the first video image; the j-th local feature image in the second video image is determined based on a range enclosed by the j-th group of feature points of the second video image; and
   determining, by the electronic device, an average value of the M similarities as the image similarity.

9. An electronic device, comprising at least one processor and at least one memory, wherein
   the memory is configured to store a program instruction; and
   the processor is configured to read the program instruction stored in the memory, to implement operations comprising:
   obtaining, by an electronic device, a facial feature of a first video image;
   determining, by the electronic device, posture information and facial change information based on the facial feature of the first video image, wherein the posture information represents deflection of a character's head indicated by the facial feature in the first video image, the facial change information represents a position change status of the character's head in the first video image and a second video image, the facial change information comprises at least one of displacement of a position of the character's head in the first video image relative to a position of the character's head in the second video image, or an image similarity between a facial image of the first video image and a facial image of the second video image, the second video image is a frame of image preceding the first video image in a video stream to which the first video image belongs, and a quantity of video images between the second video image and the first video image is within a preset quantity range, wherein the facial feature comprises N groups of feature points, wherein N is a positive integer greater than or equal to 1, different groups of feature points belong to different facial organs, and wherein the displacement in the facial change information is determined based on:

determining, by the electronic device, a distance between a reference point of an i-th group of feature points in the first video image and a reference point of an i-th group of feature points in the second video image to obtain N groups of distances, wherein i represents a positive integer less than or equal to N; and determining, by the electronic device, an average value of the N groups of distances as the displacement, or determining an average value of the normalized N groups of distances as the displacement; and determining, by the electronic device, whether the facial feature is an invalid feature based on the posture information and the facial change information.

10. The electronic device according to claim 9, wherein the determining, by the electronic device, posture information and facial change information based on the facial feature of the first video image comprises:

determining, by the electronic device, the posture information and the facial change information based on the facial feature of the first video image when the facial feature does not include a feature point located in an edge area of the first video image.

11. The electronic device according to claim 9, wherein the posture information comprises at least one of horizontal deflection used to represent left or right turning of the character's head, vertical deflection used to represent raising or lowering of the character's head, and inclination used to represent a skew degree of the character's head.

12. The electronic device according to claim 11, wherein the facial feature is determined based on:

determining, by the electronic device, that the facial feature in the first video image is an invalid feature when it is determined that at least one of the following conditions is met:

the displacement is greater than a first threshold;
the image similarity is greater than a second threshold;
the horizontal deflection is greater than a third threshold;
the vertical deflection is greater than a fourth threshold; or
the inclination is greater than a fifth threshold.

13. The electronic device according to claim 11, wherein the facial feature comprises a left cheek feature, a right cheek feature, and a nose feature; and wherein the horizontal deflection is determined based on:

determining, by the electronic device, a first distance between a reference point of the left cheek feature and a reference point of the nose feature, and a second distance between a reference point of the right cheek feature and a reference point of the nose feature; and determining, by the electronic device, a ratio of the first distance to the second distance as the horizontal deflection, or determining a ratio of the second distance to the first distance as the horizontal deflection, wherein the reference point of the left cheek feature is a preset feature point in the left cheek feature, the reference point of the nose feature is a preset feature point in the nose feature, and the reference point of the right cheek feature is a preset feature point in the right cheek feature; or the reference point of the left cheek feature is a pixel corresponding to an average value of feature point coordinates comprised in the left cheek feature, the reference point of the nose feature is a pixel corresponding to an average value of feature point coordinates comprised in the nose feature, and the reference point of the right cheek feature is a pixel corresponding to an average value of feature point coordinates comprised in the right cheek feature.

14. The electronic device according to claim 11, wherein the facial feature comprises an eye feature, a chin feature, and a nose feature; and wherein the vertical deflection is determined based on:

determining, by the electronic device, a third distance between a reference point of the eye feature and a reference point of the nose feature, and a fourth distance between a reference point of the chin feature and a reference point of the nose feature; and determining, by the electronic device, a ratio of the third distance to the fourth distance as the horizontal deflection, or determining a ratio of the fourth distance to the third distance as the vertical deflection, wherein the reference point of the eye feature is a preset feature point in the eye feature, the reference point of the nose feature is a preset feature point in the nose feature, and the reference point of the chin feature is a preset feature point in the chin feature; or the reference point of the eye feature is a pixel corresponding to an average value of feature point coordinates comprised in the eye feature, the reference point of the nose feature is a pixel corresponding to an average value of feature point coordinates comprised in the nose feature, and the reference point of the chin feature is a pixel corresponding to an average value of feature point coordinates comprised in the chin feature.

15. The electronic device according to claim 11, wherein the facial feature comprises a left eye feature and a right eye feature; and wherein the inclination is determined based on:

determining, by the electronic device, an angle in the horizontal direction of an offset of a connection line between a reference point of the left eye feature and a reference point of the right eye feature as the inclination, wherein the reference point of the left eye feature is a pixel corresponding to an average value of feature point coordinates comprised in the left eye feature, and the reference point of the right eye feature is a pixel corresponding to an average value of feature point coordinates comprised in the right eye feature; or the reference point of the left eye feature is a left eye pupil feature point in the left eye feature, and the reference point of the right eye feature is a right eye pupil feature point in the right eye feature.

16. The electronic device according to claim 9, wherein the facial feature comprises M groups of feature points, wherein M is a positive integer greater than or equal to 1, and different groups of feature points belong to different facial organs; and wherein the image similarity is determined based on:

determining, by the electronic device, a similarity between a j-th local feature image in the first video image and a j-th local feature image in the second video image to obtain M similarities, wherein j represents a positive integer less than or equal to M;

the j-th local feature image in the first video image is determined based on a range enclosed by the j-th group of feature points of the first video image; the j-th local feature image in the second video image is determined based on a range enclosed by the j-th group of feature points of the second video image; and determining, by the electronic device, an average value of the M similarities as the image similarity.

* * * * *